June 1, 1937.  A. L. CONKEY  2,082,273
AUTOMOBILE TRAILER
Filed Dec. 26, 1933  3 Sheets-Sheet 1
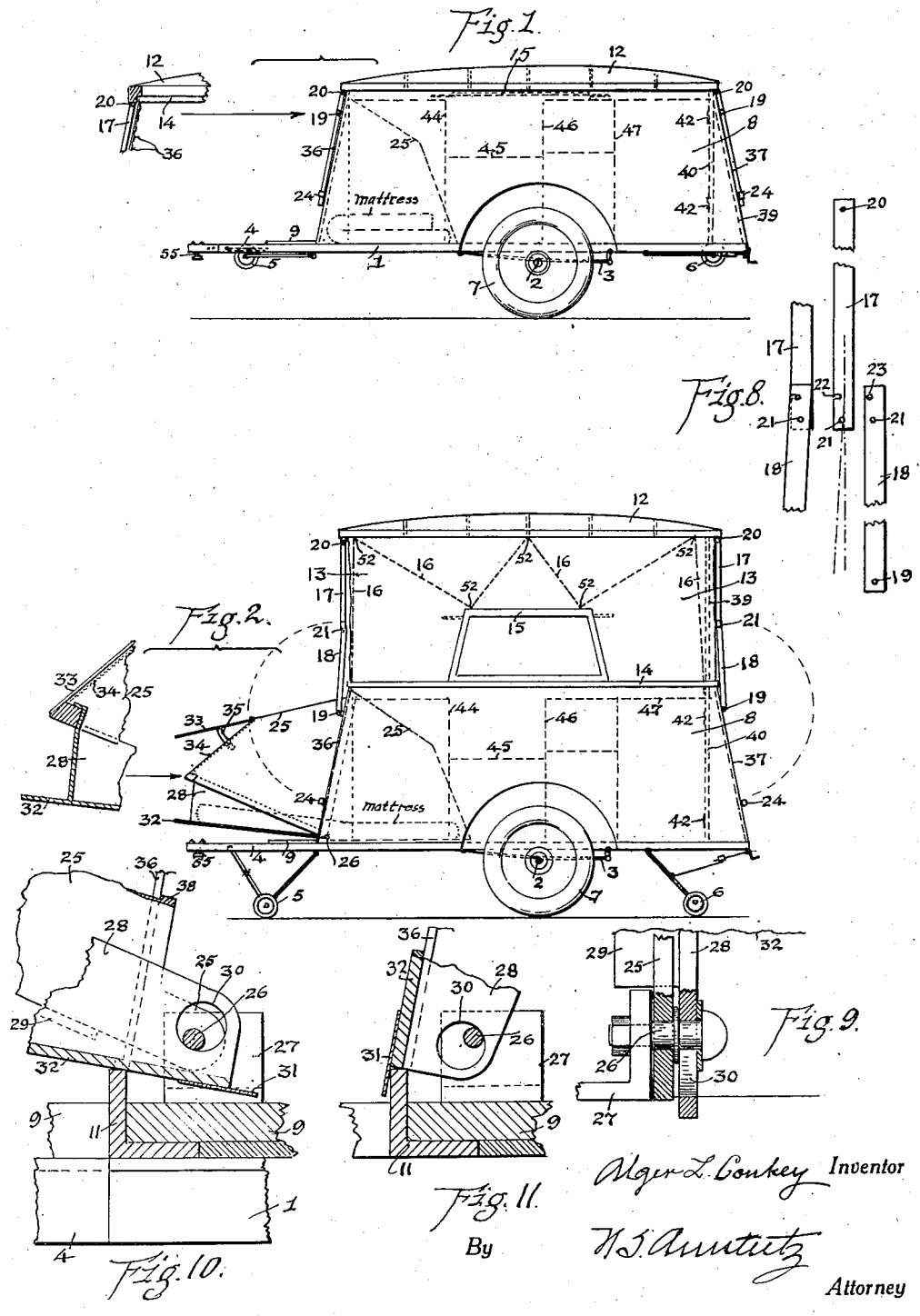

June 1, 1937. A. L. CONKEY 2,082,273
AUTOMOBILE TRAILER
Filed Dec. 26, 1933  3 Sheets-Sheet 2
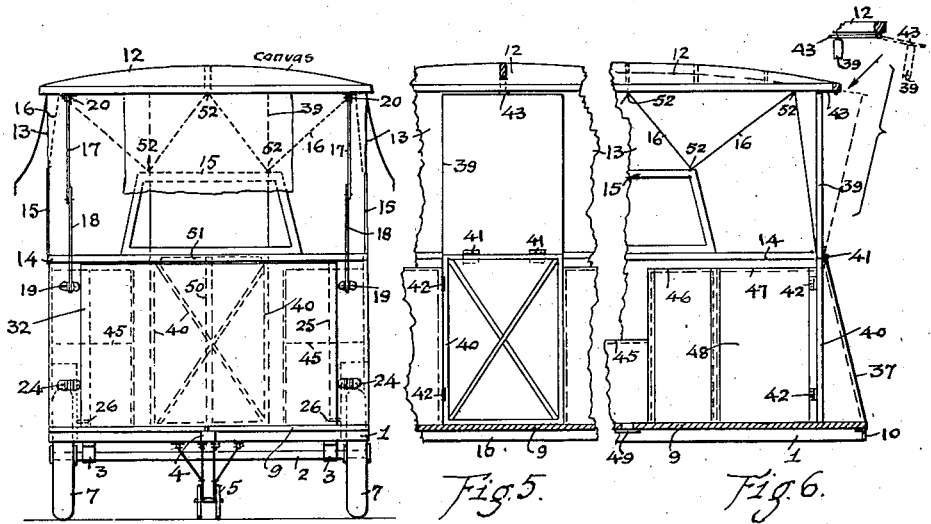
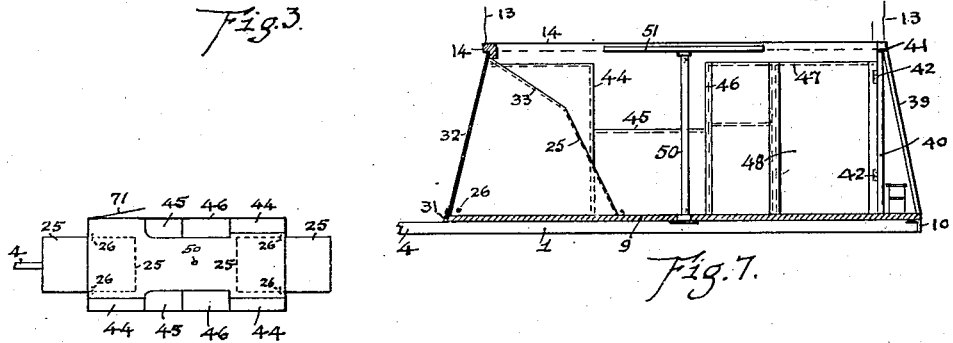
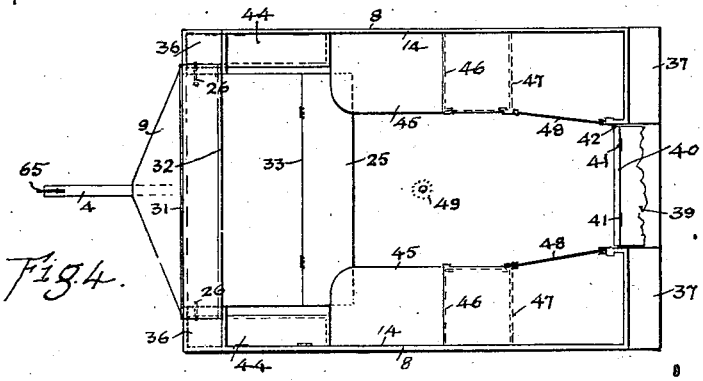
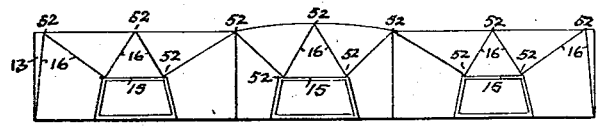

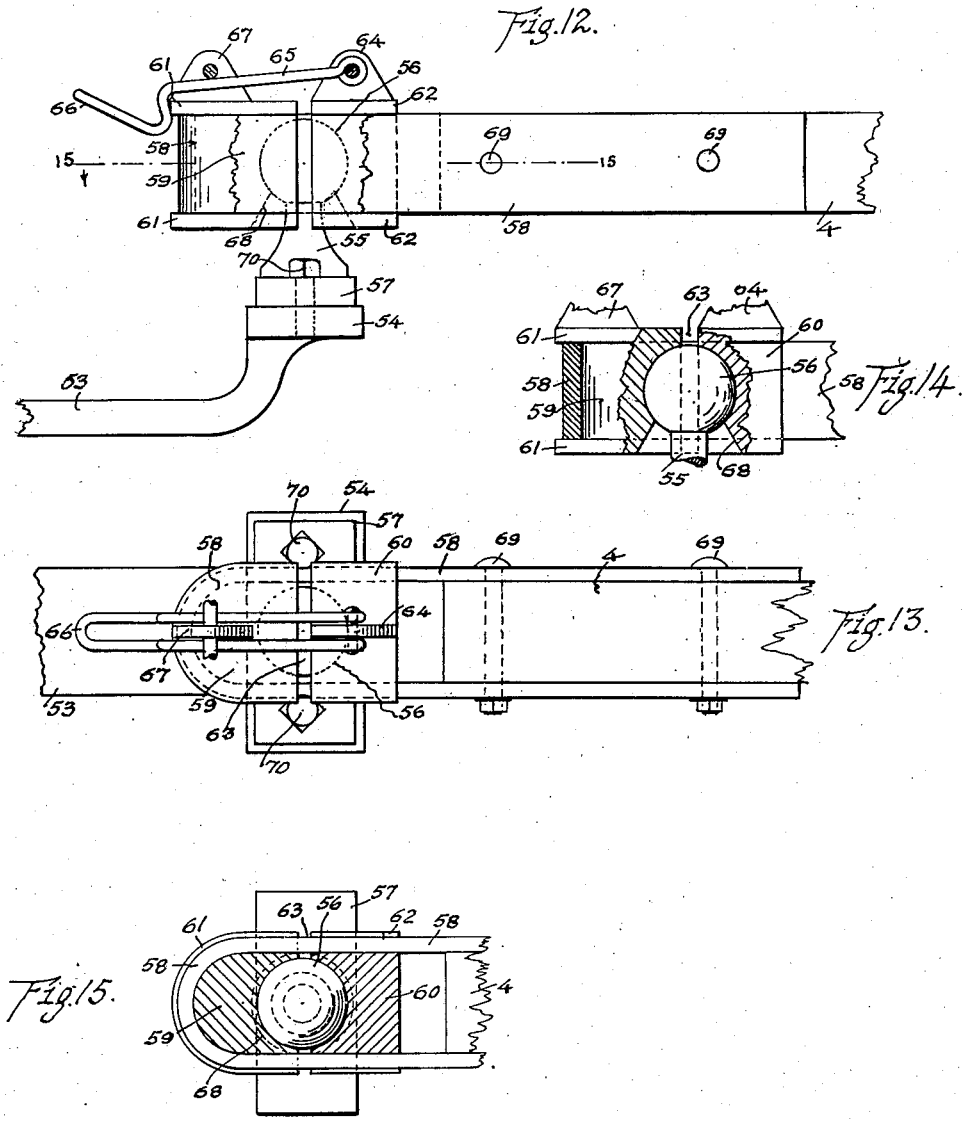

Patented June 1, 1937

2,082,273

UNITED STATES PATENT OFFICE 2,082,273

AUTOMOBILE TRAILER

Alger L. Conkey, Orlando, Calif.

Application December 26, 1933, Serial No. 703,941

3 Claims. (Cl. 296—23)

My invention relates to improvements in automobile trailers and it more especially comprises the features pointed out in the claims.

The purpose of my invention is to provide a trailer that when used for sleeping purposes occupies a width less than that of standard automobiles; that has a simplified and positive hitch for attachment to an automobile; that includes a body convertible into one or more full width and length beds lengthwise of the trailer; that has a reinforced canvas top and collapsible sides and ends of canvas provided with screened windows on the front and on both sides; that has self-locking folding supports at the front and the rear of the body for holding the top and the depending canvas in a raised position; that provides ample head room when the top is raised; and that provides means for holding the raised top rigidly against collapse until the folding supports are swung into their lowered position.

With these and other ends in view I illustrate in the accompanying drawings such instances of adaptation as will disclose the broad underlying features of my invention without limiting myself to the specific details shown thereon and described herein.

Figure 1 is a side elevation of the trailer with the top lowered ready for travel.

Figure 2 is a side elevation of the trailer with the top raised and the folding bed opened.

Figure 3 is a front elevation of Figure 2 with the bed closed.

Figure 4 is a top plan view of the interior with the top removed.

Figure 5 is an inside elevation of the door.

Figure 6 is a side elevation partly in section of the door.

Figure 7 is an elevation of the table and cabinet.

Figure 8 is an elevation of the hinged top supporting members.

Figure 9 is an elevation in section of the hinge for the folding bed.

Figure 10 is a side elevation of Figure 9 showing the bed parts opened.

Figure 11 is an elevation similar to Figure 10 showing the bed parts closed.

Figure 12 is a side elevation of the hitch.

Figure 13 is a top plan view of Figure 12.

Figure 14 is an elevation in section on the center line of Figure 13.

Figure 15 is a top plan view in section on line 15—15 of Figure 12.

Figure 16 is a diagrammatic elevation of a two-bed trailer.

Figure 17 is a developed diagrammatic view of the stabilizing cord in relation to the sides and front end of the trailer.

In operating my trailer I may use whatever alternative or equivalent structural expedients that the exigencies of varying conditions may demand without departing from the broad spirit of the invention.

I may use any desired form of frame or chassis 1 which is supported on a pair of springs 3 that are attached to the axle 2. Standard sized wheels 7 on the axle support the trailer. The body has a sloping front 36 and a sloping rear 37. It encloses seats 45, and narrow side cabinet 44 and the folded bed 25 at the front end. A two part door is placed at the rear end. To accommodate the door to the height of the top 12, when raised it is made in two parts 39 and 40, the top part 39 is hinged to the lower part at 41 so as to fold together when the top is lowered; the bottom part is hinged to the body at 42.

There is provided a table 51 under which a pipe flange is secured. A similar flange 49 is on the floor 9 and a separable pipe 50 is threaded into each flange to hold the table a little higher than the height of the cabinets 46 and 47 so that it can be swung around freely without interference while it is being attached to the upper end of the pipe. When not used as a table, it serves as a vertically sliding door 48 to one of the cabinets 47. There may also be provided a water tank, wash bowl, toilet and storage place for a vapor stove in the cabinets 46 and 47. When the vapor stove is used the "table" 51 is placed crosswise of the trailer resting on a cabinet 47 at each end. This places it across the door 39—40. Should the door be closed when the stove is used on the table the upper half of the door is swung out at its upper end to provide ventilation as shown in dotted lines on Figure 6.

When the trailer is equipped with two beds, Figure 16, one opens toward the front and the other toward the rear. In this event a door 71 is placed near the front and at one side. This arrangement lengthens the trailer slightly and some of the cabinets may be eliminated. The structure of the folding beds 25 is the same whether one or two are used. It consists of a lower or floor portion 32 loosely hinged at its inner end just inside the body on pins 26 secured to brackets 27. Side members of the bed 25 enclosing the sides and top are closely hinged on pins 26. The bed 25 is provided with a screen portion 34 and a cover 33 that may be held open by a stop 35. The mattress is rolled onto the floor 9 when the bed is closed and when it is opened the mattress lies flat and one end extends onto the trailer floor 9 and the other end lies on the extension 32. This gives a full length and full width bed. As stated a screened ventilator 33 is located just above the head of the sleeper. It may be closed at will and locked in any desired manner.

Provision is made to seal-off all the joints by flanges alongside the top and bottom edges of the bed 25, at 38 and at the side edges 29 of 28 against the ingress of dust. As the bed is being closed and when near its upper position, it is slightly raised and brought forward a short distance and dropped over a cross-wise angle 11, Figure 11. This seals off the bottom edge at 31. The raising and lowering of the bed 25 to secure the sealing along the bottom edge is accomplished by reason of the side extension 28 of the floor member 32 of the bed having enlarged holes 30 around the hinge bolts 26 on which the bed is turned in opening or closing it.

The floor portion 32 of the bed projects out far enough to seal off the upper edge of the bed against the front end of the body when the bed is closed. The floor portion 32 is connected to the sides 28 and the sides are closed by a cross member which hooks over the cross member at the outer edge of the screen 34, thus holding the floor 32 away from the tongue 4.

An outstanding feature of my trailer comprises the means for raising and lowering the top 12. Near each corner of the body 8 adjacent the top edge there is pivoted a folding support made in two parts, an upper portion 17 and a lower portion 18 of approximately the same length. The portion 17 is pivoted on the under edge at 20 of the frame of the top 12 onto which the canvas 13 for the top and sides is attached separately. These hinged supports 17 and 18 have stop pins 23 adjacent their center pivots 21 which permit the members to pass the center as the pins 23 are stopped in the slots 22 when the top is raised so that these supports may not be accidentally moved to a lowering position. When the top is lowered onto the upper rim 14 of the body the canvas 13, forming the sides and ends, including the side and front windows 15 drops down toward the tops of the cabinets 44, 46 and 47 and the closed bed 25. Limit stops may be provided on the inside so as to support the windows during the time the top is closed onto the body, thus preventing the windows scratching the furniture beneath them while the trailer is in transit. The frame of the top 12 has a reinforcing center member and transverse ribs over which the cover is secured. When raised the canvas 13 is held taut by the supports 17 hinged to the top at 20 and the supports 18 hinged to the body at 19.

To stabilize the top 12 against endwise wobble on the hinged supports 17 and 18, I brace the inside by a diagonally disposed rope or strong enough cord 16, Figs. 2 and 17. This cord is secured adjacent the one edge of the rear door 39—40, on a single bed trailer, just above the rear cabinets 47. From here the cord 16 is taken upward to the underside corner edge of the top at 52 to which it is secured; then it passes diagonally downward to the top of the right hand window 15 at its rear edge 52, thence diagonally upward to the top 12 at about midway the length of the window 15, thence diagonally downward to the top front edge of the same window at 52, thence diagonally to the front right hand corner under the top at 52, thence diagonally downward to the front window 15, and the left hand side window in the same manner, lastly being attached to the left hand rear corner of the top and finally fastened adjacent the other edge of the door above the companion cabinet 47. This cord is attached at each point mentioned to the underside edges of the top and the top edges of each window as shown in the developed view, Figure 17. It stabilizes and holds the top 12 against swaying thus serving a very important purpose.

When the top 12 is lowered its flanged side edges surround the upper rim 14 of the body and the hinged supports 17 and 18 are folded against the sloping front 36 and rear end 37 of the body where they are held by separate spring clips 24. The top 12 is first raised at the rear end until the rear pair of hinged supports 17 and 18 are pushed past their vertical center and "locked" by the pins 23, then the front end is similarly raised and "locked". The upper end 39 of the rear door which is folded downward on its hinges 41 to conform to the slope 37 of the rear end of the body 8 is unlatched and raised on its hinges 41 to meet the top where a metal strap 43 hinged to the under edge of the top is swung forward onto a vertical pin of the door 39. This pin on the door cooperates with the vertical hinges 42 on the lower half 40 of the door so that the door can be opened and closed in the usual manner. An open space is formed between the lower portion 40 of the door, standing vertically and the upper half 39 when folded down above a rear cross angle 10 as the trailer is closed. This vacant space may be occupied by a folding step that in use is placed on the ground to make it easy to enter the trailer.

When first lifting the top 12 it is raised about six inches, to free the folded door 39—40, where it may be temporarily held by any raised pivoted bar which may also serve to lock the door 39—40 from the inside when the top 12 is in its raised or open position.

The front pair of parking wheels 5 are suspended under the tongue 4 by a group of pivoted links Figure 1 which, moving over a given center hold them from dropping and conversely hold them "locked" when lowered. The rear pair of parking wheels 6 are raised and lowered by a handle attached to a worm screw on which a nut traverses. The nut is connected to the wheel suspension by pivoted links, when both sets of wheels 5 and 6 are lowered they support the trailer against tilting fore and aft and they also facilitate moving the trailer by hand whenever found necessary.

I have devised a novel hitch at the front end of the tongue 4. This consists of two hollow-halves 59 and 60 held in place by a U-shaped member 58 that is secured to the tongue 4 on its sides by bolts 69. The rear half 60 is slidable toward the front half 59. It has a loop 65 pivoted to a projection 64 at its top. The loop 65 passes over a beveled projection 67 on the top of the forward half 59. The two hollow centers form a socket for the ball 56 forming the upper end of the hitch post 55. The attachment to the rear of an automobile with which the trailer is to be used is indicated at 53. It has a flat end 54 on which the base 57 of the hitch post 55 is fastened by bolts 70. This relation of parts forms a ball and socket connection susceptible of universal movement within certain practical limits, determined by the clearances 68. The connection is maintained as long as desired by reason of the loop 65 referred to having a catch 66 which hooks under a projection 61 of the forward part 59 of the hitch. To disengage the trailer it is only necessary to raise this loop 65 which instantly frees the hitch 53 from the auto, by sliding the part 60 rearward far enough to free the ball 56. When the parts 59 and 60 are closed onto the ball 56 a clearance space 63 is left between them to allow for wear of the ball 56 and the engaging sockets. The part 59 has top and bottom flanges 61 and the part 60 has similar flanges 62. These flanges form channels for the U-shaped member 58. A pad lock may be secured in the projections 67, above the loop 65.

What I claim is:—

1. An automobile trailer comprising a wheel supported body having a movable front end extension, horizontal pivots between the floor of the body and the extension, a separately hinged floor for the extension, sealing means between the extension its hinged floor and the body, means for pivoting the floor of the extension to the horizontal pivots eccentrically, and means for holding the extension closed within the trailer body so that its floor is approximately parallel to the slope of the front end of the body.

2. An automobile trailer including a wheel supported body, a unitary top adapted to be raised and lowered bodily, canvas sides and ends, a plurality of folded supporting bars pivoted to the body and the top, limiting means on the bars for holding them in an extended position, an anti-swaying tension cord having both ends attached to the body, and means for securing the cord alternately to the top and approximately midway of the canvas width at a plurality of points so as to stabilize the top.

3. An automobile trailer including a wheel supported body, a rear end door comprising an upper and a lower section hinged to each other, means for pivotally attaching the lower section to the body, and means for pivotally attaching the upper section to the top when it is raised, whereby the upper door section can be swung downward on the outside of the lower section so as to permit lowering the top onto the body with its canvas sides and ends draped inside of the body.

ALGER L. CONKEY.